Dec. 20, 1949   J. F. SHIVELY, SR   2,491,588
EXTRUSION DIE
Filed April 19, 1945

JAMES F. SHIVELY, SR.
INVENTOR.

BY *Cleveland B. Hollabaugh*
ATTORNEY

Patented Dec. 20, 1949

2,491,588

UNITED STATES PATENT OFFICE 2,491,588

EXTRUSION DIE

James F. Shively, Sr., Belvidere, N. J., assignor to Hercules Powder Company, Wilmington, Del., a corporation of Delaware Application April 19, 1945, Serial No. 589,257

1 Claim. (Cl. 18—12)

This invention relates to the extrusion of of smokeless powder and more particularly to an extrusion die for smokeless powder.

Smokeless powder strands prepared by extrusion methods sometimes have a rough, scaly surface. Roughness mars the appearance of the finished product and also hinders handling the strands. The barbs and scales responsible for the roughness of the strand come off during cutting, screening, and packing operations requiring the operators to use dust masks and speed a good portion of their time freeing the machines of scales. The strands may lose up to 0.1% of their weight in this manner. Thus, the problem of preventing formation of surface roughness is a serious one.

Attempts have been made to prevent surface roughness but without success. The die surfaces have been highly polished and the die bore tapered as much as 0.25 in./ft. over the whole or greater part of its length. Despite this, rough-surfaced strands have nevertheless been produced. In fact, tapering has had the additional disadvantage of giving rippled strands of non-uniform thickness.

Now in accordance with this invention, smokeless powder strands have been prepared whose surfaces are smooth and free of barbs and scales. This has been accomplished by extruding the smokeless powder through a die of normal uniform diameter provided with a constriction projecting inwardly into the extrusion chamber adjacent the egress orifice, reducing the diameter of the die at that point. That part of the constriction within the extrusion chamber forms a smooth throat whose diameter is narrowest at the orifice end of the constriction and gradually increases in diameter farther within the die chamber below the orifice. The edge of the egress orifice is of reduced sharpness compared to the extrusion dies of the prior art.

The extrusion dies having a constriction in accordance with this invention may be prepared by the various methods of die manufacture, all of which are well known and need not be described in detail here. It is, however, possible to prepare extrusion dies in accordance with this invention by simple modification of the standard unconstricted dies employed by the art. This method of forming the constriction will vary with the size and shape of the die orifice. Where, for example, the egress orifice is circular, a sphere having a diameter greater than the diameter of the orifice may be placed upon it so that it rests on the orifice and projects into the extrusion chamber. Pressure is applied to the sphere along the axis of the extrusion chamber, deforming the extrusion chamber wall circumscribing the orifice, and forming a constriction of uniform effective width, projecting inwardly into the extrusion chamber. At the same time the outer face of the die surrounding the egress orifice acquires the shape of the sphere and an orifice edge of reduced sharpness is formed.

The nature of this invention has been indicated in a general way. Reference now is made to the drawings which represent preferred embodiments thereof. Like reference symbols refer to like parts wherever they occur.

Fig. 3 is also an enlarged fragmentary, half-sectional view of the egress end of the die of Fig. 1.

Figure 1:
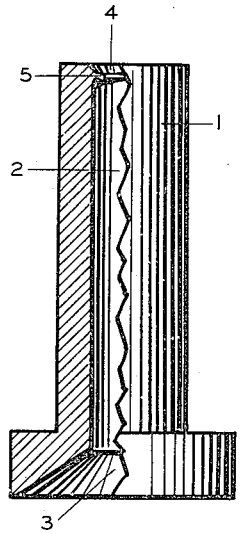
Fig. 1 is a half-sectional, half-elevational view of one form of extrusion die in accordance with this invention.

The walls of the extrusion die 1 in Fig. 1 define an extrusion chamber 2 provided with an ingress orifice 3 and an egress orifice 4. The inner die wall at the orifice 4 forms a constriction 5 0.0019 inch in effective width projecting inwardly into the extrusion chamber 2, reducing its diameter at that point. In operation smokeless powder to be extruded is forced through the orifice 3 into the extrusion chamber and is discharged from the extrusion chamber as a strand at the orifice 4. The surface of the extruded strand is smooth through the action of the constriction 5.

Figure 2:
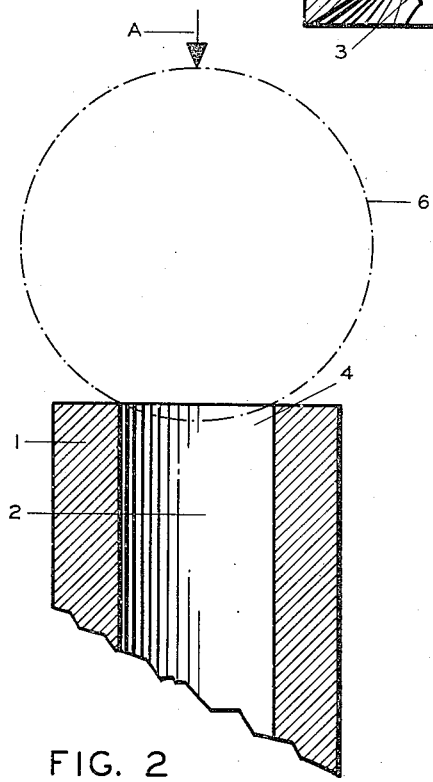
Fig. 2 is an enlarged, fragmentary, half-sectional view of the egress end of the extrusion die of Fig. 1 prior to formation of the constriction in accordance with this invention. The position of a sphere for formation of the constriction is shown.
Figure 3:
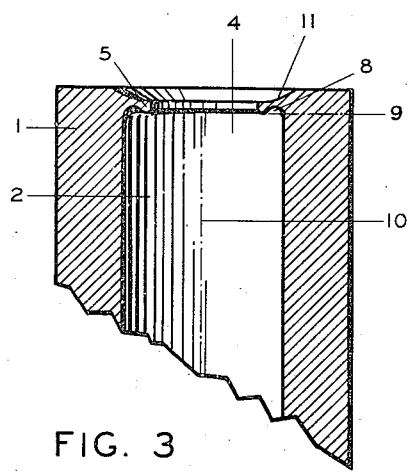
Fig. 3 is a half-sectional view of the die depicted in Fig. 2 subsequent to formation of the constriction.

Figs. 2 and 3 together show two steps in one method of forming the constriction in accordance with this invention. A suitable sphere 6 having a diameter greater than the diameter of the egress orifice 4 is placed so that it rests on and projects into the orifice 4 of the extrusion chamber 2. Pressure along the axis of the extrusion chamber, as indicated by the arrow A, is then applied to the sphere 6. Following the pressing operation the sphere is removed.

The pressing operation results in the formation of a constriction 5 0.0019 inch in effective width projecting inwardly into the extrusion chamber 2, as shown in Fig. 3. That part of the constriction 5 within the extrusion chamber 2, that is, the inner face 8 of the constriction, has a nonuniform width, said width being greatest adjacent the egress orifice 4. The constriction shown in the drawing is in the form of a short rounded bulge and forms a throat 9 in the extrusion chamber 2. The throat 9 is narrowest adjacent the egress orifice 4. The exterior face 10 of the constriction has acquired the shape of the sphere. The orifice edge between the inner and outer faces of the constriction is rounded. As a result of this constriction smokeless powder extruded through the die has substantially no barbs and scales.

The practical application of this invention is illustrated in the following examples:

Example 1

A smokeless powder mixture was prepared containing 83.25% nitrocellulose (13.2% nitrogen content), 17.00% dinitrotoluene, and 0.65% diphenylamine. This mixture was blocked, macaronied, blocked, and extruded to form a rough strand having barbs and scales on its surface. The strand after being cut in suitable lengths and dried was of a type designated as 0.05-inch web cannon powder.

A cylindrical die having a centrally located single extrusion chamber 0.403 inch in diameter was employed. The ingress orifice was funnel-shaped to facilitate feeding of the powder. At the egress orifice the wall of the extrusion chamber formed a 90° angle with the end of the die. The orifice had a sharp edge. The die was of uniform diameter and had no constriction at the egress orifice. The extrusion chamber was fitted with seven pins 0.037 inch in diameter, one pin being centrally located and the other six pins being regularly spaced in a 0.228 inch diameter circle around the center pin.

The die was removed from the extrusion machine and carefully cleaned. It was then placed egress orifice uppermost with a 1 inch diameter steel ball resting on the orifice as shown in Fig. 2. The ball was tapped with a hammer, the metal forming the circumference of the orifice being deflected inwardly under the pressure. In this manner a construction was formed projecting into the extrusion chamber and the egress orifice was given an edge of reduced sharpness. The end of the die acquired the shape of the sphere. That part of the constriction within the extrusion chamber formed a throat narrowest in diameter at the orifice and increasing in diameter towards the interior of the extrusion chamber. The diameter of the orifice upon completion of the constriction-forming operation was 0.401 inch and had thus been reduced 0.002 inch in diameter. The width of the constriction at its widest point was therefore 0.001 inch. This width is called the "effective width" of the constriction and is defined as one-half the difference between the normal inner diameter of the die and the diameter of the die at the narrowest point of the throat formed by the constriction.

The modified die was placed in the extrusion machine and powder of the same composition previously employed extruded through it. The extruded strands were smooth and free of barbs and scales. When granulated and dried, the strands had a diameter and a web which was substantially the same as that of the finished powder strands extruded through dies having no constriction at the egress orifice end of the extrusion chamber.

Example 2

Smokeless powder of the same composition as that described in Example 1 was blocked, macaronied, blocked, and extruded to form a strand which when granulated and dried was of a type designated as 0.033-inch web cannon powder. The strands obtained were rough, characterized by a surface layer of barbs and scales.

A steel cylindrical die was employed having a centrally located extrusion chamber 0.270 inch in diameter. The walls of the extrusion chamber were flared at the ingress orifice while at the egress orifice they formed a right angle having a sharp edge with the end of the die. The extrusion chamber was fitted with seven pins 0.022 inch in diameter, one pin being centrally located while the other six were evenly spaced in a 0.152 inch diameter circle about the center pin.

This die was removed from the extrusion machine and cleaned. It was then fastened with the egress orifice uppermost and a steel ball 0.875 inch in diameter placed on the orifice. The ball was tapped with a hammer causing the metal at the circumference of the orifice to form a constriction projecting inwardly into the extrusion chamber. The outer end of the die contacted by the ball acquired the shape of the ball. That part of the constriction within the extrusion chamber formed a throat whose diameter was narrowest adjacent the orifice. At the conclusion of the constriction-forming operation the diameter of the egress orifice was 0.268 inch and had thus been reduced 0.002 inch in diameter. The effective width of the constriction was therefore 0.001 inch.

The die was reinserted in the extrusion machine and smokeless powder of the same composition as employed previously extruded through it. Smooth powder strands free of barbs and scales were obtained. When granulated, cut, and dried, the strands had a diameter and web substantially the same as that of the finished powder extruded through an unconstricted die whose diameter was the same as the normal diameter of the constricted die.

Example 3

A smokeless powder was prepared containing 3% dibutylphthalate, 10% dinitrotoluene, 1.05% diphenylamine, and 85.95% nitrocellulose having a nitrogen content of 13.2%. This powder was blocked, macaronied, blocked, and extruded to form a strand which was cut in suitable lengths, dried, and used as 0.033-inch web cannon powder. The powder strands had barbed and scaled surfaces.

A steel extrusion die having a centrally located extrusion chamber 0.282 inch in diameter was used. The wall of the extrusion chamber at the ingress orifice was flared while at the egress orifice the walls formed a right angle with a sharp edge with the end of the die. The die was fitted with seven pins 0.022 inch in diameter. One pin was centrally located in the extrusion chamber while the other six pins were regularly spaced in a 0.159 inch diameter circle around the center pin.

This die was removed from the extrusion machine and cleaned. It was fastened rigidly, egress orifice uppermost, on a flat working surface and a steel ball 0.875 inch in diameter having a Rockwell C hardness of 64 placed upon the orifice.

Force was applied to the ball along the axis of the extrusion chamber using a hand-operated hydraulic press. It was found that forces under 12,500 pounds were not effective in forming a constriction. Above forces of 16,000 pounds the entire die tended to bulge outward. Forces of between 12,500 and 16,000 were, however, quite satisfactory. At a force of 14,000 pounds a constriction having an effective width of 0.0005 inch was formed. The diameter of the orifice after formation of the constriction was 0.281 inch and the orifice had a smooth edge.

The modified die was placed in the extrusion machine and a strand of power of the composition previously employed extruded through it. A smooth-surfaced strand was produced free of barbs and scales. The powder strands when granulated and dried had the same diameter and web as smokeless powder extruded through dies whose normal diameter was the same but which had no constriction at the egress orifice end of the extrusion chamber.

*Example 4*

Smokeless powder of the composition described in Example 3 was blocked, macaronied, blocked, and extruded, as in the previous examples, to give a 0.033-inch web cannon powder. The die employed was 0.282 inch in diameter and was fitted with seven pins 0.022 inch in diameter as set forth in Example 3. The extruded smokeless powder strand was rough due to the presence of barbs and flakes on its surface.

The extrusion die employed was removed from the extrusion machine and cleaned. It was then rigidly supported with the egress and uppermost and a 1 inch diameter ball having a Rockwell C hardness of 64 was placed on the egress orifice. Pressure was applied to the steel ball along the axis of the extrusion chamber by a hand-operated hydraulic press. The pressure was gradually increased until the ram was exerting a total force of about 14,000 pounds and was then immediately released. The walls of the extrusion chamber at the egress orifice were deformed by the ball forming a constriction projecting inwardly into the extrusion chamber. The upper end of the die acquired the shape of the ball and the sharpness of the edge of the orifice was reduced. The effective width of the constriction formed was 0.001 inch and the diameter of the orifice 0.280 inch.

The die was replaced in the extrusion machine and powder of the same composition as before extruded through it. A smooth-surfaced strand substantially free from barbs and scales was produced. When granulated and dried it had the same diameter and web as powder extruded through the die prior to formation of the constriction.

The constrictions in accordance with this invention are formed at the egress orifice end of the extrusion die. They may be in the shape either of a short taper or a rounded bulge adjacent the orifice. The inner face of the constriction is preferably convex since a concave surface tends to shave the exterior surface of smokeless powder passed through the die. Preferred constrictions in accordance with this invention have the following characteristics:

(1) That part of the constriction within the extrusion chamber should have a nonuniform width, said width being greatest adjacent the egress orifice. Thus, the constriction should define a smooth throat which is narrowest adjacent the orifice and gradually increases in diameter farther within the die chamber below the orifice.

(2) That part of the constriction outside the extrusion chamber, that is, that part forming the egress end of the die, should be slanting and may be modified further by being either concave or convex. When the constriction is formed employing a constriction-forming means as shown in the examples, this part of the constriction will be concave having acquired the shape of the constriction-forming means.

(3) The edge of the egress orifice should be smooth and rounded.

By employing pressures in excess of those required to produce constrictions with the above characteristics it is possible to form a flange projecting inwardly into the extrusion chamber whose interior face together with the wall of the extrusion chamber define a concavity. A line perpendicular to the die's outside wall extending therefrom to the tip of this flange intersects the concavity defined by the interior face of the flange and the wall of the extrusion chamber. Since the inner face of this flange or constriction is concave and hence tends to shave the die, it is not as desirable as the type of constriction which meets characteristic (1) above. It will be appreciated, however, that this type flange meets characteristics (2) and (3) above and may therefore be employed under certain conditions.

It has been found that constrictions whose effective width varies between 0.0005 and about 0.0050 inch give satisfactorily smooth strands. It is desirable to form a constriction whose effective width is not large so that reduction of the diameter of the extrusion chamber at the egress orifice is as small as possible. Thus, constrictions whose effective width is between 0.0005 and about 0.0010 inch are preferred. Constrictions of these effective widths give smokeless powder strands whose diameter is not substantially smaller than the diameter of strands produced by extrusion through nonconstricted dies, since the surfaces of the latter strands require polishing and smoothing and may also lose a good proportion of surface material through flaking and dusting during these operations.

Extrusion dies having constrictions described above may be formed according to any of the die manufacturing procedures known to the art. In addition, commercially available dies having a normal uniform bore without a constriction at the egress orifice may be modified to form the dies in accordance with this invention. A constriction-forming means larger in diameter than the extrusion chamber of the die and having the same cross-sectional shape as the die extrusion chamber may be placed upon the egress orifice. Pressure exerted upon the constriction-forming means on the axis of the extrusion chamber deforms the metal forming the circumference of the metal into a constriction whose effective width is greatest at the orifice, decreasing towards the interior of the extrusion chamber.

As shown in the examples, this method is readily applied to dies whose extrusion chambers are circular in cross-section. In such instances a sphere, in general, has been found to be the most effective constriction-forming means. However, an inverted cone having a base larger in diameter than the diameter of the extrusion chamber and a height to the apex which is less than the diameter of its base has also been found to be satisfactory. For dies with square extrusion chambers, an inverted regular pyramid whose base end is larger in diameter than the diameter of the egress orifice and whose height from base to apex is less than the diametrical width of the base may be employed as the constriction-forming means. Depending upon the cross-sectional shape of the extrusion chamber, other constriction-forming means may be employed.

The constriction-forming means should be sufficiently hard to impress its shape upon the egress orifice and should be so shaped that one end will project into the egress orifice and the other end will have a diameter larger than that of the orifice so that a deforming force will tend to bulge the normal wall of the die at the orifice inwardly may be exerted. For any given size of die bore as the ratio of diameter of the constriction-forming means to the diameter of the egress orifice decreases, the effective width of the constriction formed increases and the outline of the constriction changes. Consequently, ratios above 1 and below 1½ are satisfactory but are not as desirable as those above 1½ because of the shape of the constriction formed. Constriction-forming means having a diameter at least 1½ times the diameter of the die extrusion chamber are preferred. Employing such constriction-forming means, the outline of the constriction varies from a short to a bulge having a somewhat spherical shape depending upon the exact ratio and upon the amount of pressure exerted upon the constriction-forming means.

The pressure exerted will, of course, depend upon the hardness of the die metal and the hardness of the constriction-forming means and also upon the width of the constriction desired. Low pressures will produce constrictions convex in outline and high pressures will tend to produce constrictions concave in outline. In general, the pressure exerted should not be more than that barely needed to produce the constriction since there is danger that a portion of the die below the opening may be distorted. Forces between 12,500 and 16,000 pounds have been found satisfactory. It is essential that the pressure be exerted along the axis of the extrusion chamber so that a constriction of uniform effective width will be formed. Unless the constriction is uniform in effective width and pitch, strands of powder with smooth surfaces but irregular diameter may be produced.

The materials employed in the preparation of the dies and the constriction-forming means in accordance with this invention include steel of various types, such as carbon steels, manganese, nickel, nickel-chromium, molybdenum, molybdenum-chromium, molybdenum-chromium-nickel, chromium, chromium-vanadium, and silicon-manganese steels and also iron, bronze, brass, or plastics of the necessary hardness.

The exact reason why extrusion dies with the constrictions in accordance with this invention produce smooth smokeless powder strands free of barbs and scales while unconstricted dies do not is not known. It is believed that powder is released from the constricted die more gradually than from nonconstricted dies. This is due to the profile of that portion of the die between the egress end of the constriction and the surface of the egress end of the die. In unconstricted dies the extrusion chamber wall and the egress end of the die meet at a right angle. In constricted dies in accordance with this invention that portion of the egress end adjacent the egress orifice has been deformed so that it has a slanting surface which may be either slightly concave or slightly convex. The sharpness of the edge of the orifice, relative to unconstricted dies, is reduced; generally, the orifice edge is rounded. This rounded edge in combination with the constriction's projecting inwardly into the extrusion chamber substantially eliminates barbs and scale formation and rough surfaces.

The term "Rockwell hardness" as used in the specifications expresses the degree of penetration of a 1/14 inch diameter ball penetrator on the surface being tested. The degree of penetration is expressed on an arbitrary scale in which a higher scale reading indicates a harder surface. The procedure is outlined in A. S. T. M. tests.

What I claim and desire to protect by Letters Patent is:

In an extrusion die, an elongated body member having therein a cylindrical extrusion chamber of uniform radius extending longitudinally from the ingress orifice in the ingress end of the body member to a circumferential constriction at the egress orifice in the egress end of the body member, said constriction extending inwardly into the extrusion chamber immediately adjacent the egress orifice and having a uniform radius between 0.0005 and 0.005 inch less than the radius of the extrusion chamber, the edge of said egress orifice being smoothly flared outwardly from the constriction.

JAMES F. SHIVELY, SR.

REFERENCES CITED

The following references are of record in the file of this patent:

UNITED STATES PATENTS

| Number | Name | Date |
| --- | --- | --- |
| 1,482,000 | Engman | Jan. 29, 1924 |
| 1,548,869 | Morgan | Aug. 11, 1925 |
| 2,245,608 | Rogers | June 17, 1941 |
| 2,276,468 | Couchman | Mar. 17, 1942 |
| 2,368,355 | Guiney | Jan. 30, 1945 |

Certificate of Correction

Patent No. 2,491,588 December 20, 1949

JAMES F. SHIVELY, Sr.

It is hereby certified that errors appear in the printed specification of the above numbered patent requiring correction as follows:

Column 1, line 11, for the word "speed" read *spend*; column 3, line 50, for "construction" read *constriction*; column 5, line 14, for "power" read *powder*; column 5, line 36, for "egress and" read *egress end*; column 7, line 13, after the word "force" insert *which*; column 8, line 54, list of references cited, for patent number "1,548,869" read *1,548,896*;

and that the said Letters Patent should be read with these corrections therein that the same may conform to the record of the case in the Patent Office.

Signed and sealed this 18th day of April, A. D. 1950.

[SEAL]

THOMAS F. MURPHY,
*Assistant Commissioner of Patents.*